April 24, 1928.
R. D. GODSEY ET AL
1,667,000
MILK DISTRIBUTOR AND BOTTLE COLLECTOR
Filed March 9, 1927    3 Sheets-Sheet 1
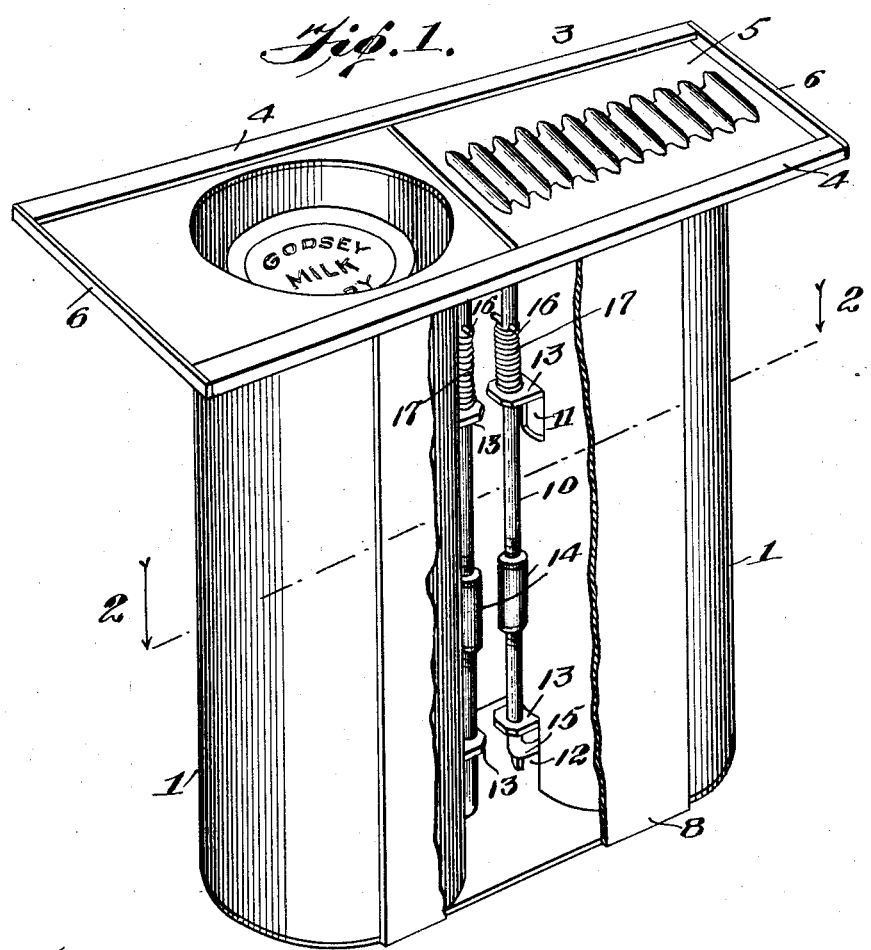
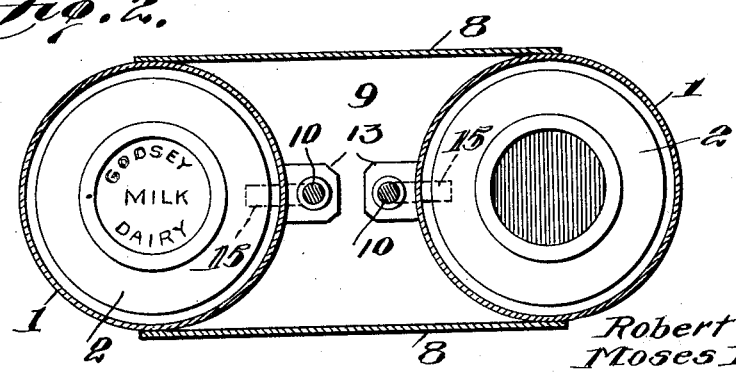
INVENTORS.
Robert D. Godsey
Moses P. Litton
By ____, ATTORNEYS.

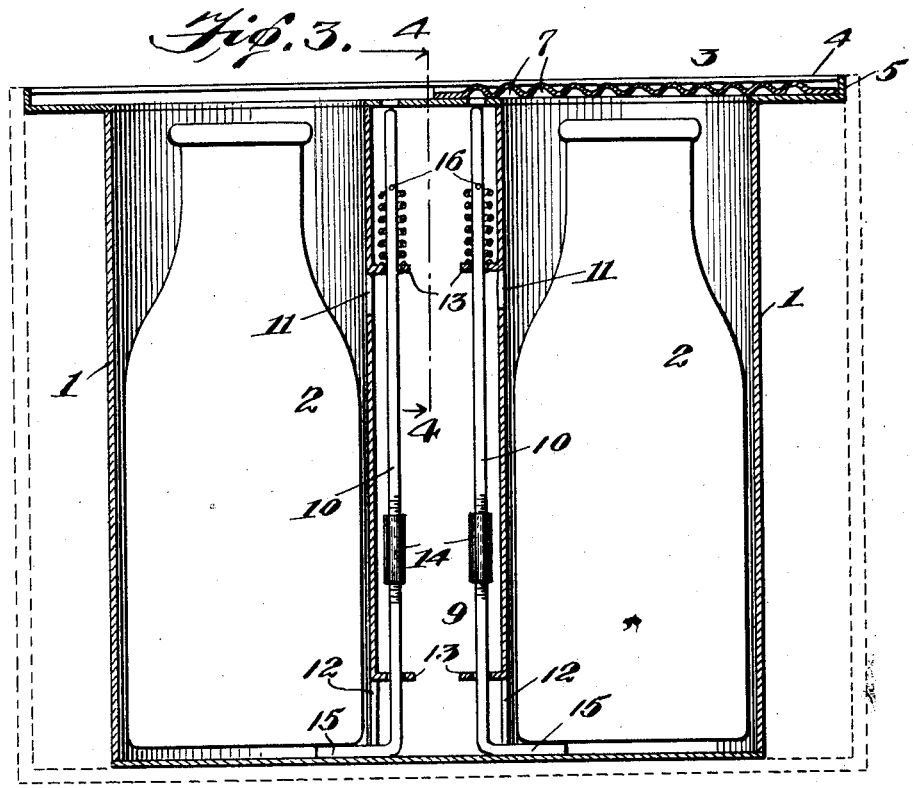
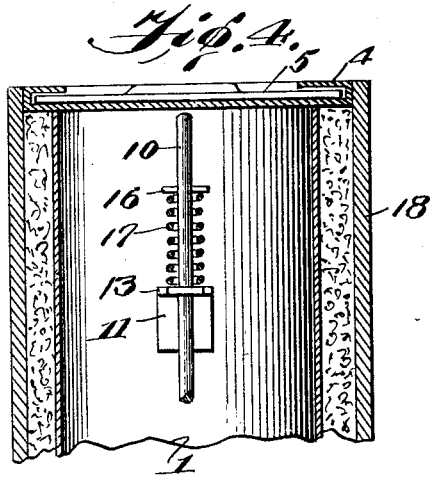
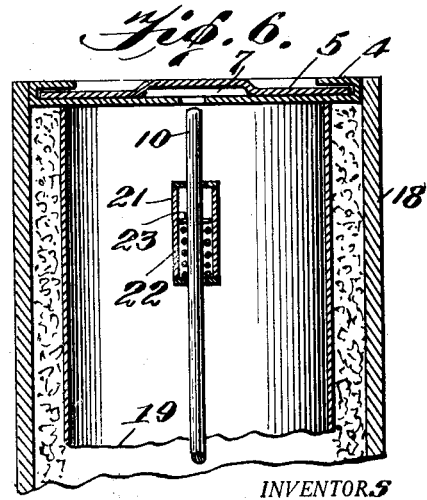

April 24, 1928.
R. D. GODSEY ET AL
1,667,000
MILK DISTRIBUTOR AND BOTTLE COLLECTOR
Filed March 9, 1927   3 Sheets-Sheet 3
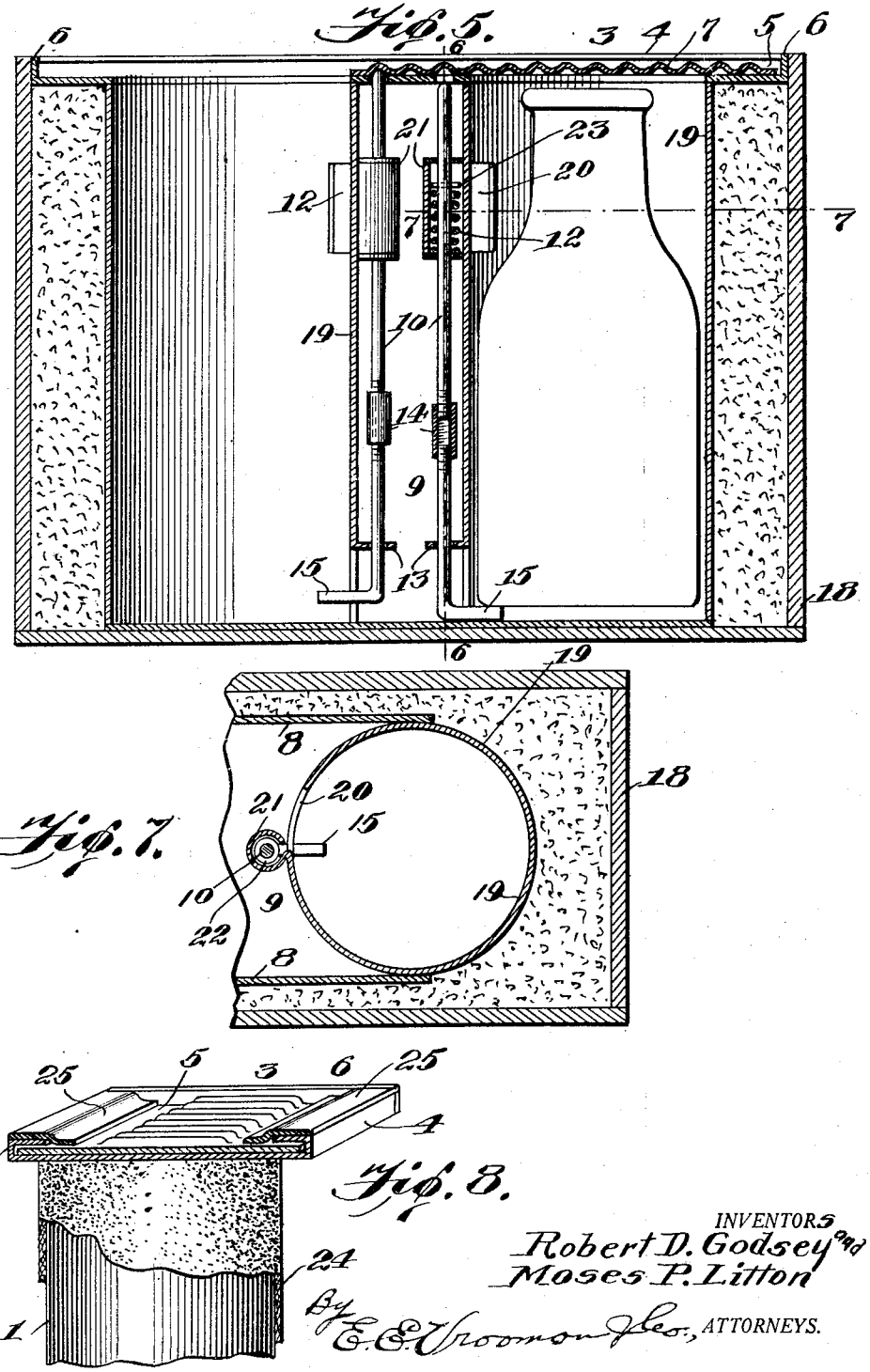
INVENTORS
Robert D. Godsey and
Moses P. Litton
ATTORNEYS.

Patented Apr. 24, 1928.

1,667,000

UNITED STATES PATENT OFFICE.

ROBERT D. GODSEY AND MOSES P. LITTON, OF BRISTOL, VIRGINIA, ASSIGNORS OF THREE-FOURTHS TO SAID GODSEY AND ONE-FOURTH TO SAID LITTON.

MILK DISTRIBUTOR AND BOTTLE COLLECTOR.

Application filed March 9, 1927. Serial No. 173,915.

This invention relates to a milk distributor and bottle collector.

The object of this invention is the provision of simple and efficient means for protecting the filled milk bottle from extreme hot or cold weather, preventing the bottle, or bottles from being stolen, and insuring that an empty bottle will be in the container for the milk man, when he delivers a filled bottle.

With the foregoing and other objects in view, our invention comprises certain novel constructions, combinations and arrangements of parts as will be hereinafter fully described, illustrated in the accompanying drawings, and more particularly pointed out in the appended claims.

In the drawings:

Figure 1 is a perspective view of an apparatus constructed in accordance with the present invention.

Figure 2 is a sectional view taken on line 2—2, Figure 1, and looking in the direction of the arrows.

Figure 3 is a vertical central sectional view of the apparatus shown in Figure 1.

Figure 4 is a sectional view taken on line 4—4, Figure 3, and looking in the direction of the arrows.

Figure 5 is a vertical longitudinal sectional view of another embodiment of the present invention.

Figure 6 is a sectional view taken on line 6—6, Figure 5.

Figure 7 is a sectional view taken on line 7—7, Figure 5.

Figure 8 is a fragmentary perspective view of another embodiment of the present invention.

Referring to the drawings by numerals, 1, 1 designates the two containers for receiving the milk bottles 2. These containers are preferably cylindrical shape and are made of metal. The top structure 3 includes side guide flanges 4 between which slides the top 5. The top structure 3 also includes end flanges 6, which limit the sliding movement of the top 5. The top 5, as well as the whole of the top structure, is preferably made of metal, and is punched up in its middle to form sockets 7, and this punched-up socketed structure also constitutes a handle, for the operator to grasp, for sliding the top 5 back and forth over the containers 1.

The containers 1 are spaced apart, and by flat or sheet strips 8, soldered or otherwise secured to the sides of the containers (Figs. 1 and 2), a compartment 9 is formed in which the top locking plunger rods 10 are positioned. On the contiguous faces of the containers 1, within compartment 9, I cut out, at 11 and 12, portions of the metal containers for forming integral, horizontal apertured brackets 13. The plunger rods 10 are slidably mounted in said brackets 13. Each plunger rod is composed preferably of two sections; the contiguous ends of the sections of each rod are threaded into a turn buckle 14, so that the height of each rod can be accurately adjusted for causing each rod to fit nicely into the sockets 7 of the sliding top 5. The lower end of each plunger rod is bent as at 15 for engagement with the bottom of a milk bottle; this right angled extension 15 extends through the cut-out 12 of the container 1.

Pins 16 extend through the plunger rods above the upper brackets 13, and mounted on said rods between brackets 13 and pins 16 are coil springs 17, which normally exert upward pressure on the plunger rods for causing the upper ends of the plunger rods to be seated in the sockets 7 of the top 5 when no bottles are in the containers 1.

The housewife usually places an empty bottle in one of the containers 1, and the weight of this empty bottle depresses the plunger rod of the container in which said empty bottle is placed, causing the top 5 to be unlocked.

Upon the milk man placing a filled bottle in the other container 1, the top 5 can be slid over the container with the filled bottle therein, allowing the milk man to lift out the empty bottle, whereupon the spring pressed plunger, of the empty container will move into engagement with the sliding top and lock it, until the houswife places another empty bottle in the empty container, whereupon she can then extract the filled milk bottle. In this way, an empty milk bottle has to be "surrendered" by the housewife before she can secure the filled milk bottle, which insures the milk man securing all empty bottles due him, which prevents a great loss to the dairy man that occurs where bottles of filled milk are left on the porches or steps or like places of houses and restaurants.

It will also be understood that by our apparatus, the filled bottles are protected against dogs and cats licking the same or knocking the filled bottles over. The apparatus can be fastened to a support, such as steps or porches, by any suitable fastening means, such as screws (not shown) and the like.

In the embodiment shown in Figures 5, 6 and 7, we have shown a box 18 in which are placed the containers 19. These containers 19 are engaged by the sheet strips 8, producing compartment 9, and within box 18, we place suitable insulating material, so that in the winter time the milk is kept from freezing, and in the summer time, the milk is kept from spoiling by becoming overheated. In Figure 4, we have shown the box 18 and have indicated the same in Figure 3 by dotted lines.

The containers 19 (Figure 5) are cut away, at 20, and the cut-away portion is rolled into a cylinder 21. Each cylinder 21 has its ends partially closed and within each cylinder is a coil spring 22. A pin 23 is on each rod, within cylinder 21, so that the coil spring 22 normally exerts an upward pressure on the plunger rod 10 just as in the embodiment shown in Figures 1 and 3. The other details of the embodiment shown in Figure 5 are similar to the details of the embodiment shown in Figure 3.

In the embodiment shown in Figure 8, we preferably wrap each container with a sheet of insulating material 24. The top 5 can be covered with a sheet of insulating material (not shown) and the edges of the guide flanges 4 can be sealed by strips 25 secured over the meeting portions of cap 5 and the edges of said guide flanges 4.

In Figure 3, the apparatus is shown with two bottles therein, with the top locking plunger rods in "unlocked" positions, not engaging the top 5, whereas in Figure 5, one of the containers has a bottle therein, and the other container has not; consequently, in Figure 5, the top 5 is shown locked over the container having the bottle therein. Upon a bottle being placed in the empty container (Fig. 5) the top 5 will be automatically released or unlocked whereby the operator can extract one of the bottles easily.

While we have described the preferred embodiments of our invention and illustrated the same in the accompanying drawings, certain minor changes or alterations may appear to one skilled in the art to which this invention relates during the extensive manufacture of the same, and we, therefore, reserve the right to make such alterations or changes as shall fairly fall within the scope of the appended claims.

What we claim is:

1. In an apparatus of the class described, the combination of a plurality of containers, a top structure including a sliding top upon said containers, and bodily movable locking means extending into said containers and actuated by the weight of a bottle and adapted to normally engage said top for preventing sliding movement thereof.

2. In an apparatus of the class described, the combination of a plurality of containers, a top structure including a sliding top above said containers, a plurality of vertically movable locking devices contiguous to said containers and each adapted to engage and lock said top against sliding movement, and each of said locking devices extending into a container near its bottom and adapted to have a milk bottle rest thereon.

3. In an apparatus of the class described, the combination of a plurality of containers, a top structure provided with a sliding top on said containers, said top provided with a struck-up portion having sockets, said struck-up portion constituting a handle for operating the top, and bottle-operated locking means extending into said containers and normally adapted to engage said sockets for locking the top against sliding movement.

4. In an apparatus of the class described, the combination of a plurality of containers, a sliding top above said containers, said containers provided with bent-out integral brackets, and spring pressed plunger rods slidably mounted in said brackets and adapted to engage said top for locking the same against sliding movement, each of said plunger rods extending into a container and adapted to be engaged by a bottle for holding the plunger rod in an inoperative position.

5. In an apparatus of the class described, the combination of a plurality of containers, a sliding top above said containers, brackets on said containers, spring pressed plunger rods mounted on said brackets and adapted to engage said top for preventing movement thereof, and each plunger rod provided with means extending into a container for engagement with a bottle, whereby the plunger rod is held in an inoperative position.

6. In an apparatus of the class described, the combination of a plurality of containers, a sliding top above said containers, and adjustable bottle-engaging rods at the sides of said containers and each adapted to engage and hold said top against movement.

7. In an apparatus of the class described, the combination of a container, a sliding top above said container, and a bodily movable rod extending at one end into said container for engagement with a bottle and at its other end adapted to engage and lock said top against movement.

8. In an apparatus of the class described, the combination of a container, a sliding top above said container, said container provided with a side opening, a movable rod adapted to engage at one end said top for locking the top against sliding movement, and the other end of said rod extending through said side opening and adapted to be engaged by a bottle for holding the rod from engagement with said sliding top.

9. In an apparatus of the class described, the combination of a plurality of containers, a sliding top above said containers and adapted to close the top of one container at a time, each container provided with cut-out portions producing brackets and openings upon said containers, sectional spring pressed rods slidably mounted upon said brackets and adapted to engage at their upper ends said top for locking the top over said containers, and said rods extending at their lower ends through some of said openings and into said containers for allowing milk bottles to be seated thereon.

10. In an apparatus of the class described, the combination of a plurality of containers provided with a compartment therebetween, a sliding top above said containers and compartment, and vertically-movable top-locking means within said compartment and extending into said containers near their bottom.

11. In an apparatus of the class described, the combination of a plurality of containers having a compartment therebetween, a sliding top above said containers and said compartment, and bodily movable top-locking means within said compartment and extending into said containers for engagement with bottles.

In testimony whereof we hereunto affix our signatures.

ROBERT D. GODSEY.
MOSES P. LITTON.